Figure 1:
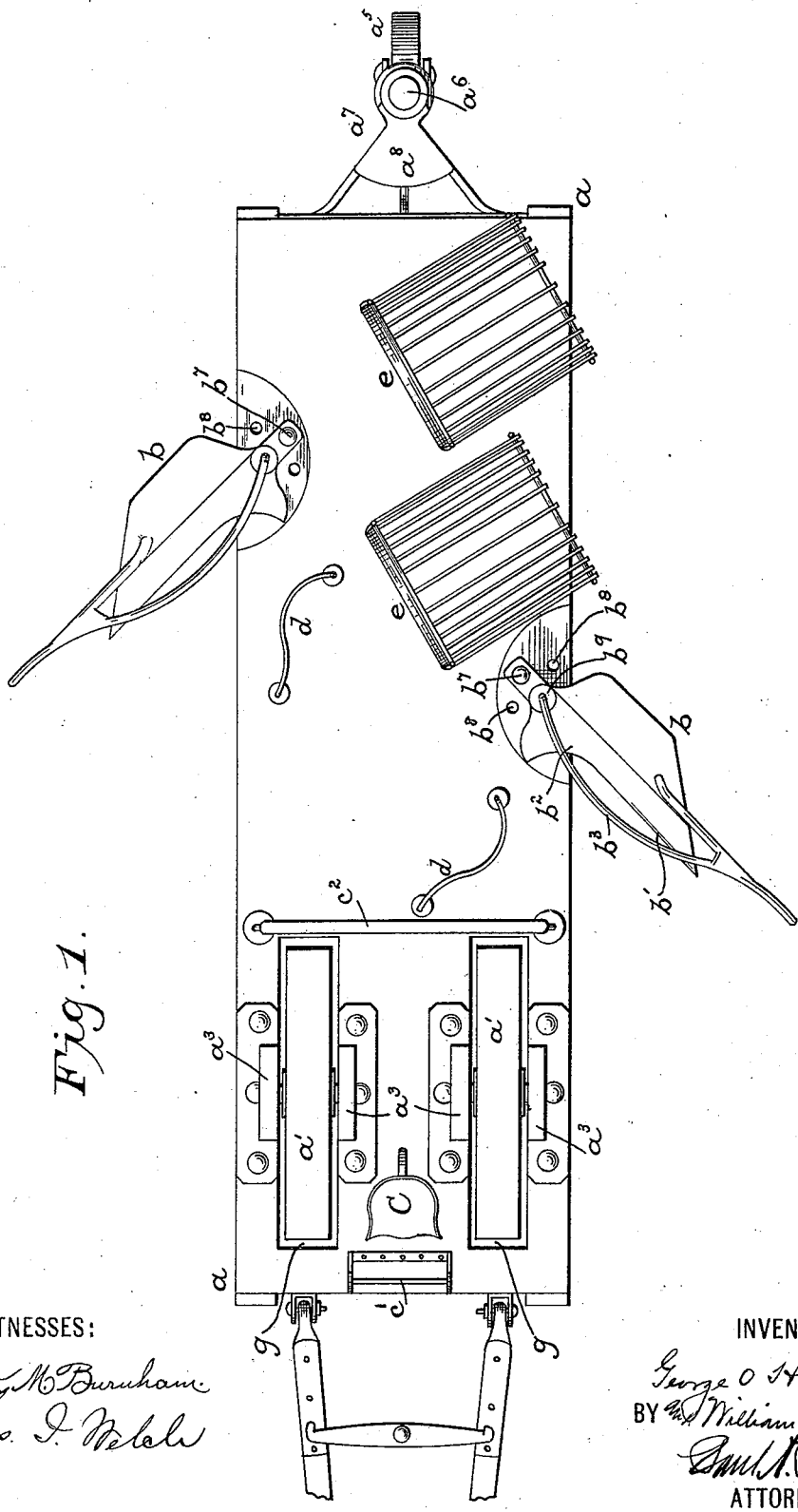

(No Model.) 2 Sheets—Sheet 1.
G. O. & W. H. HOUCK.
CORN HARVESTER.

No. 552,290. Patented Dec. 31, 1895.

WITNESSES:
Frank M. Burnham
Chas. I. Welch

INVENTORS
George O Houck
William H. Houck
BY
ATTORNEY

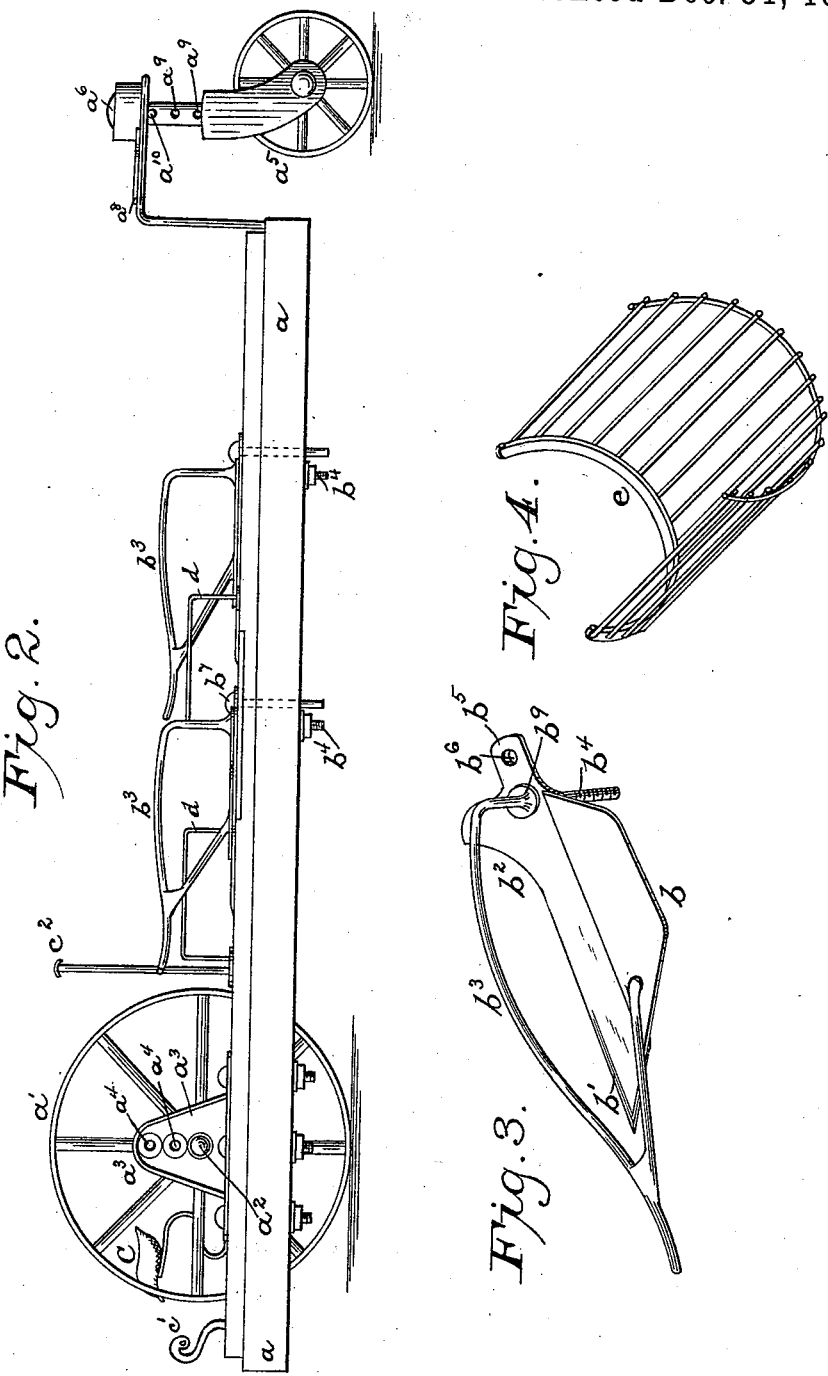

UNITED STATES PATENT OFFICE.

GEORGE O. HOUCK AND WILLIAM H. HOUCK, OF SPRINGFIELD, OHIO.

CORN-HARVESTER.

SPECIFICATION forming part of Letters Patent No. 552,290, dated December 31, 1895.

Application filed February 4, 1895. Serial No. 537,248. (No model.)

*To all whom it may concern:*

Be it known that we, GEORGE O. HOUCK and WILLIAM H. HOUCK, citizens of the United States, residing at Springfield, in the county of Clark and State of Ohio, have invented certain new and useful Improvements in Corn-Harvesters, of which the following is a specification.

Our invention relates to improvements in corn-harvesters.

The object of our invention is to provide a simple machine adapted to be drawn between rows of standing corn so as to cut two rows at a time, means being provided by which the corn may be gathered by the operators and placed in convenient position for shocking. We attain this object by the construction shown in the accompanying drawings, in which—

Figure 1 is a plan view of a machine embodying our invention. Fig. 2 is a side elevation of the same. Fig. 3 is a detail view in perspective of one of the adjustable knives, and Fig. 4 is a similar view of one of the gathering or shocking frames.

Like parts are represented by similar letters of reference in the several views.

In the said drawings, $a\ a$ represent a main frame, which may be of any suitable construction to support the operating parts, and made preferably rectangular in shape and of a width which will pass readily between two rows of standing corn. This frame is supported at the front on two main supporting-wheels $a'\ a'$, each of which is journaled on a shaft or trunnion $a^2$, supported in stationary bearing-supports $a^3$, arranged on opposite sides of openings $g$, formed in the frame, and also having a series of openings $a^4$, in either of which the trunnions or shafts may be placed so as to adjust the height of the main frame from the ground. The rear end of the frame is supported on a caster-wheel $a^5$, the stem $a^6$ of which is supported in a bearing $a^7$ on a projecting hanger $a^8$, and is provided with opening $a^9$ to receive a pin $a^{10}$, by means of which the height of the frame in the rear may be adjusted with reference to said caster-wheel. We preferably employ a single caster-wheel, as shown, though it is obvious that two or more may be employed, if desired.

On each side of the frame is pivoted an adjustable cutting-knife $b$, which projects at an angle from the side of the frame and is provided with means by which the angle may be adjusted as desired. These knives $b$ each consist of a blade $b'$, which is straight for the greater portion of its length, but is curved inwardly and forwardly at the side next to the frame, as shown at $b^2$, so that where the cutting-edge crosses the edge of the frame a curved line is secured which obviates a sharp corner or angle at the junction between the side line of the frame and the cutting-edge of the knife. Each knife is further provided with a guard $b^3$, which is attached at each end to the knife $b$, and is curved upwardly and forwardly, thence backwardly and downwardly, so that the guard crosses the blade on a curved line and at some distance above the same, and presents a curved surface in advance of the cutting-edge. As before stated, two of these knives are employed, one on each side of the machine and one in advance of the other. Each knife is provided with a projecting trunnion $b^4$, which fits in a suitable bearing in the frame and in which it may be revolved to change the angle of the knife. The knife is further provided with an extended lug $b^5$, having therein an opening $b^6$ to receive a pin or bolt $b^7$, which may be placed in any one of a series of openings $b^8$, so as to change the angle of the knife as desired.

Between the carrying-wheels and at the front is a seat $c$ for the driver and a foot-rest $c'$. Immediately in the rear of the wheels is a guard-rail $c^2$ to divide the rear part of the frame from the front, which carries the wheels, the rear part being formed preferably flat so as to constitute a platform on which the operators stand. Foot-guards $d$ are placed upon the platform adjacent to each knife to form a foot-support for the operators, there being one for each knife.

Immediately behind the forward knife and on the same side of the platform therewith are the gathering or shocking frames $e$, one for each operator. These frames consist of semicircular racks, of any suitable or desirable construction, and are adapted to rest on the platform at a suitable angle and in convenient position, so that each operator places the corn gathered by him into one of these racks.

The operation of the device is as follows: The knives being adjusted to the proper angle the machine is drawn forward between the rows of corn. As the machine is advanced, the guard $b^3$ comes in contact with the stocks first and bends the stocks slightly forward. The knife then strikes the stocks at the place where the stem is bent, which, being under tension at this point, is more readily severed by the cutting-edge. The operator seizes the stocks as they come in contact with the knife, and as they are severed lifts them up and places them in one of the gathering or shocking frames $e$. As soon as the gathering-frames are full the machine is stopped and each operator takes his frame and turns it vertically, with the open side of one opposite the open side of the other, the two thus making a shock. The shock is tied and the operation completed.

The arrangement of the knife having the curved heel obviates the sharp angle at the frame and makes it practically impossible for the stocks to become wedged at this point. By having the knives adjustable, as described, any suitable angle may be obtained which will be best adapted to the work to be performed.

We have shown the knives with the point of each knife in advance of the heel; but by the arrangement described, if desired, the position may be reversed so that the heel will be in advance of the point by simply revolving the knife about its trunnion.

We have shown the guard $b^3$ extended downwardly at the inner end and provided with a collar $b^9$, which rests on the top of the knife, the end of the guard being extended through the knife to form a trunnion $b^4$ on which the knife turns. This is a desirable construction, though by no means essential, as a separate trunnion may be employed and the guard attached to the knife in any suitable or desirable manner.

Having thus described our invention, we claim—

1. A cutting knife for corn harvesters having a straight cutting edge and curved heel as described, a guard consisting of a curved rod which extends outwardly, thence inwardly so as to cross the cutting edge of said knife near the point and heel as described, said guard being supported above said knife and connected at each end thereto near the point and heel, a projecting trunnion on said knife and a perforated extended lug beyond said trunnion, substantially as specified.

2. In a corn harvester, a main frame, a cutting knife projecting at an angle therefrom, a guard secured to said knife and adapted to project upwardly and outwardly so as to form a curved surface in front of and above said knife, said guard being extended downwardly through said knife to form a trunnion therefor, substantially as specified.

3. In a corn harvester having a main frame and cutting knives, the semi-circular detachable gathering frames supported on said main frame in proximity to said knives, said frames being adapted when placed vertical with their open edges together to form a cylindrical shocking device open at each end, substantially as specified.

In testimony whereof we have hereunto set our hands this 28th day of January, A. D. 1895.

GEORGE O. HOUCK.
WILLIAM H. HOUCK.

Witnesses:
OLIVER H. MILLER,
CHAS. I. WELCH.